Patented Jan. 12, 1954

2,666,055

UNITED STATES PATENT OFFICE 2,666,055

1-THIOCARBAMYL-4-HETEROCYCLIC PIPERAZINES

Edward A. Conroy, Plainfield, N. J., assignor to American Cyanamid Company, New York, N. Y., a corporation of Maine No Drawing. Application October 27, 1952, Serial No. 317,150

7 Claims. (Cl. 260—256.5)

The present invention relates to N-heterocyclic piperazines. More particularly, it relates to 1,4-disubstituted piperazines having a

group in the 1-position and a nitrogen-containing heterocyclic substituent in the 4-position. The invention is concerned both with the method of preparation and the compounds per se and is a continuation-in-part of my copending application, Serial Number 197,520, filed November 24, 1950, now abandoned.

More specifically, the present invention is concerned with compounds capable of representation by the generic formula:

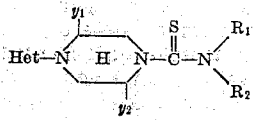

wherein Het represents a pyridyl, pyrimidyl, pyrazinyl or thiazolyl radical and $y_1$ and $y_2$ represent hydrogen or methyl; $R_1$ represents hydrogen or an aliphatic radical of 1–6 carbon atoms; and $R_2$ represents hydrogen, an alkyl radical of 1–6 carbon atoms or a phenyl or alkyl-, halogen-, or alkoxy-substituted phenyl radical. The bond from the nitrogen in the 4-position of the piperazine ring must be to a carbon adjacent to a nitrogen in the heterocyclic radical.

The compounds of the present invention being 1,4-substituted piperazines, the latter ring is shown as saturated. However, in addition to the 1,4-substituents, the carbon atoms of the ring may also be substituted. As shown in the generic formula above, $y_1$ and $y_2$ may be either hydrogen or methyl. The invention, therefore, contemplates 1,4-disubstituted mono- and di-methyl piperazines.

The compounds of the present invention, therefore, may be classified as thio-carbamyl piperazines. In general, they comprise white crystalline materials which are, in general, relatively insoluble in ordinary ether and petroleum ether, only slightly soluble in water, but readily soluble in the ordinary alkanols. Compounds of the present invention in general have anticonvulsant properties. They exhibit distinct possibilities as pharmacologically active compounds for this purpose.

Preparation of the new compounds of the present invention may be accomplished in several ways, dependent to a large extent on the nature of the product to be obtained. Certain methods are specific to a particular group of compounds.

However, one method is generally applicable to the preparation of these compounds. This method may be represented as follows:

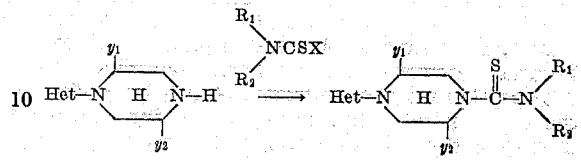

(wherein X is halogen). While this type reaction is of general utility, certain precautions must be exercised with respect to its use.

For example, a reaction of a monoheterocyclic piperazine with a thiocarbamyl halide, as represented above, is usually accompanied by the evolution of heat. The exothermic character of the reaction may be controlled readily as by cooling the reaction mixture, by regulating the rate of mixing the two reactants, and by using a solvent and/or diluent for the reaction. Though a solvent need not be used for this reaction, we prefer to use a solvent.

Though a wide variety of materials, such as benzene, toluene, chlorobenzene, dibutyl ether, dioxane, diethyl ether, and the like may be used as solvents for the reaction, we prefer to use benzene.

During the course of this reaction, one of the by-products evolved is a hydrogen halide. We prefer to neutralize this as it is formed. In order to accomplish this, an acid-binding agent, such as an alkali metal carbonate or bicarbonate, or a basic organic substance, such as pyridine, quinoline, lutidine and the like, is usually added at the start. We prefer to use a carbonate or bicarbonate.

The temperature at which reaction is carried out is not unduly critical. The temperature range usually is determined both by the nature of the reactants and the nature of the solvent. Since, however, the reaction is exothermic, control of the temperature is usually desirable and may be accomplished as previously described. In general, where benzene is used as the solvent, the reaction is preferably carried out between 10° C. and the boiling point of benzene.

Depending upon the nature of the product, it may or may not be soluble in the reaction mixture. If it is soluble, the reaction mixture is filtered to remove insoluble salts. The filtrate is concentrated by distillation of the benzene and the product, which is left as a residue, is usually purified by crystallization from a solvent, such as water, a lower alkanol, ethyl acetate, methyl ethyl ketone, acetone, or a mixed solvent such as alcohol-ether. The solvent chosen for this purpose is dependent upon the character of the product.

Though the above method is generally applicable, it is, due to the availability of starting materials, particularly useful for the preparation of 1 - (di - substituted thiocarbamyl)-4-heterocyclic piperazines; while more specific methods are more useful for the preparation of 1-(monosubstituted thiocarbamyl) - and 1-(unsubstituted thiocarbamyl)-4-heterocyclic piperazines.

1-(mono-substituted thiocarbamyl)-4-heterocyclic piperazines are most readily prepared by the reaction of a heterocyclic piperazine with an organic isothiocyanate. This reaction may be represented as follows:

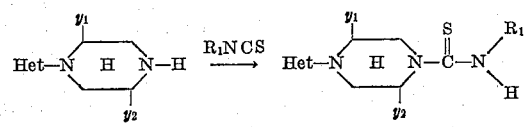

While this reaction is of general utility, certain precautions must be noted with regard to its use.

In most instances this general reaction is exothermic. However, the exothermic character of the reaction may be controlled readily by cooling the reaction mixtures, by regulating the rate of mixing of the two reactants, and by using a solvent and/or diluent for the reaction. Though no solvent need be used for the reaction, we prefer to use a solvent for several reasons. A solvent, acting also as a diluent, makes the exothermic character of the reaction more easily controllable. The proper choice of a solvent is also advantageous in keeping the reactants dissolved while allowing the product to crystallize freely in a relatively pure state as the reaction proceeds.

Though a wide variety of materials, such as petroleum ether, naphtha, benzene, toluene, chlorobenzene, dioxane, chloroform, pyridine, and the like, may be used as solvents for the above general reaction, a dialkyl ether, such as diethyl ether, dibutyl ether and the like is preferable. These ether solvents are particularly effective in dissolving both of the reactants and yet allowing the product of the reaction to crystallize freely as it is formed.

In general, the temperature at which this general reaction may be carried out is not critical. If necessary it may be carried out between 0° C. and the boiling point of the solvent. However, for practical reasons, the temperature range of about 0° to 35° C. is to be preferred.

Isolation of the product from the reaction mixture is readily accomplished. Since the product crystallizes in a relatively pure form directly from the reaction mixture, it may be isolated simply by filtration. If it is desirable to have the product in a state of higher purity than it is after isolation, the product may be recrystallized from a suitable solvent, such as naphtha, or a mixed solvent, such as alcohol-ether.

1-(unsubstituted thiocarbamyl)-4-heterocyclic piperazines may most readily be prepared by heating the thiocyanate addition salt of a heterocyclic piperazine. This heterocyclic piperazine thiocyanate salt is conveniently prepared by the reaction of a heterocyclic piperazine with thiocyanic acid. The conversion of a heterocyclic piperazine to a 1-thiocarbamyl-4-heterocyclic piperazine may, therefore, be represented in two steps as follows:

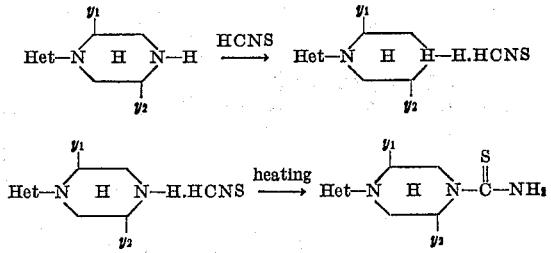

The reaction between the heterocyclic piperazines, which, in general, are liquids miscible with water, and thiocyanic acid, an unstable gas at room temperature, is most conveniently carried out in the presence of a solvent. While a variety of solvents may be used, water is the preferred medium, and the reaction proceeds rapidly at room temperature. Since aqueous solutions of thiocyanic acid decompose on standing, freshly prepared solutions are always used and may be obtained in several ways. The heterocyclic piperazine itself may be dissolved in an aqueous solution together with a water-soluble inorganic thiocyanate, such as potassium thiocynate, ammonium thiocyanate, or the like, and the solution acidified. Alternately, an acid addition salt of the heterocyclic piperazine such as a hydrochloride, sulfate, hydrobromide and the like may be dissolved in water and treated with a soluble inorganic thiocyanate. Another useful method is the treatment of a heterocyclic piperazine solution with a freshly acidified solution of an organic thiocyanate. The acid used is not critical; such acids as hydrochloric, hydrobromic, sulfuric, acetic and the like may be used. Since acid addition salts of heterocyclic piperazines with hydrochloric acid, sulfuric acid and the like are readily available and convenient to handle it is preferred to use them for the preparation of the 1-heterocyclicpiperazine thiocyanates. When the reaction is carried out in the preferred solvent, water, the thiocyanate salt crystallizes directly from the reaction mixture, and is isolated and dried. This salt is then heated to about its melting temperature for several hours, and the 1-(unsubstituted thiocarbamyl)-4-heterocyclic-piperazine is isolated from the melt. The thiocarbamyl compounds are, in general, less soluble than the corresponding thiocyanate salts, and usually may be separated from unreacted thiocyanate salts by recrystallization from water. If further purification is desired, the thiocarbamyl compound may be recrystallized from a solvent such as a lower alkanol, isopropyl acetate, or the like.

Preparation of compounds within the scope of this invention is more fully shown in the following examples which are given as illustrative only and not by way of limitation. All parts are by weight unless otherwise noted.

EXAMPLE 1

*1-(2-pyridyl)-4-thiocarbamylpiperazine*

To a solution of 246 parts of 1-(2-pyridyl)-piperazine in 300 parts of water is added 150 parts of concentrated hydrochloric acid. Then a solution of 150 parts of potassium thiocyanate in 150 parts of water is added at room temperature. The 1-(2-pyridyl)-piperazine thiocyanate is isolated by filtration and, when purified by recrystallization from water, melts at 135°–137° C. This salt is then fused and the melt is held at about 150° C. for seven hours to give the product, 1-(2-pyridyl)-4-thiocarbamylpiperazine which, when pure, melts at 171.0°–171.5° C.

EXAMPLE 2

*1-(2-pyrazinyl)-4-thiocarbamylpiperazine*

By following the same procedure as Example 1 except that an equivalent amount of 1-(2-pyrazinyl)-piperazine is substituted for 1-(2-pyridyl)-piperazine and a fusion temperature of about 180° C. is used, 1-(2-pyrazinyl)-4-thiocarbamylpiperazine, melting point 196.0–196.5° C., is obtained.

EXAMPLE 3

*1-(2-pyrimidyl)-4-thiocarbamylpiperazine*

By following the same procedure as Example 1 except that an equivalent amount of 1-(2-pyrimidyl)-piperazine is substituted for 1-(2-pyridyl)-piperazine, 1-(2-pyrimidyl)-4-thiocarbamylpiperazine, melting point 178.0–178.5° C., is obtained.

EXAMPLE 4

*1-(2-pyridyl)-4-ethylthiocarbamyl-piperazine*

A solution of 26 parts of ethyl isothiocyanate in 140 parts of dry ether is slowly added with cooling, over a period of about 15 minutes, to a solution of 50 parts of 1-(2-pyridyl)-piperazine in 140 parts of dry ether. The white precipitate is isolated by filtration and crystallized from benzene. It melts at 98°–99° C.

By following the above procedure, but by substituting therein an equivalent amount of an isothiocyanate shown in column 1 of the following table for the ethyl isothiocyanate and an equivalent amount of the corresponding 1-heterocyclicpiperazine in column 2 of the table for the 1-(2-pyridyl)-piperazine, the substituted piperazine listed opposite in column 3 is obtained. The melting point of each of the latter is listed opposite in column 4.

TABLE

| Isothiocyanate | 1-heterocyclic-piperazine | Product | M. P., °C. |
|---|---|---|---|
| Ethyl | 1-(2-pyrazinyl)-piperazine. | 1-(2-pyrazinyl)-4-ethylthiocarbamyl-piperazine. | 147–148 |
| Do | 1-(2-thiazolyl)-piperazine. | 1-(2-thiazolyl)-4-ethylthiocarbamyl-piperazine. | 149–150 |
| Allyl | 1-(2-pyridyl)-piperazine. | 1-(2-pyridyl)-4-allylthiocarbamyl-piperazine. | 88–89 |
| Do | 1-(2-pyrimidyl)-piperazine. | 1-(2-pyrimidyl)-4-allylthiocarbamyl-piperazine. | 114–115 |
| Phenyl | 1-(2-pyridyl)-piperazine. | 1-(2-pyridyl)-4-phenylthiocarbamyl-piperazine. | 140–141 |
| Do | 1-(2-pyrimidyl)-piperazine. | 1-(2-pyrimidyl)-4-phenylthiocarbamyl-piperazine. | 157–158 |
| Do | 1-(2-thiazolyl)-piperazine. | 1-(2-thiazolyl)-4-phenylthiocarbamyl-piperazine. | 180–181 |
| Allyl | 1-(2-pyrazinyl)-piperazine. | 1-(2-pyrazinyl)-4-allylthiocarbamyl-piperazine. | 102–103 |

I claim:
1. A heterocyclic thiocarbamyl piperazine of the formula:

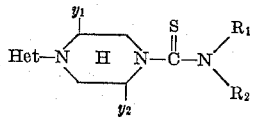

wherein $y_1$ and $y_2$ are selected from the group consisting of hydrogen and methyl, Het is a heterocyclic radical selected from the group consisting of the pyridyl, pyrimidyl, pyrazinyl and thiazolyl radicals, the bond from the nitrogen in the piperazine ring to the Het radical being to a carbon adjacent to a nitrogen in said Het radical, $R_1$ is hydrogen and $R_2$ is selected from the group consisting of hydrogen, lower alkyl, lower alkenyl and phenyl radicals.

2. A thiocarbamyl piperazine having the formula:

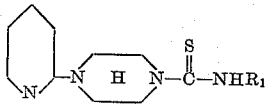

in which $R_1$ is a lower alkenyl radical.

3. 1-(2-pyridyl)-4-allylthiocarbamylpiperazine.

4. 1-(2-pyrazinyl)-4-allylthiocarbamylpiperazine.

5. 1-(2-thiazolyl)-4-ethylthiocarbamylpiperazine.

6. 1-(2-pyrimidyl)-4-allylthiocarbamylpiperazine.

7. 1-(2-pyridyl)-4-phenylthiocarbamylpiperazine.

EDWARD A. CONROY.

No references cited.